US006891010B2

(12) United States Patent
Kunzler et al.

(10) Patent No.: US 6,891,010 B2
(45) Date of Patent: May 10, 2005

(54) SILICONE HYDROGELS BASED ON VINYL CARBONATE ENDCAPPED FLUORINATED SIDE CHAIN POLYSILOXANES

(75) Inventors: Jay F. Kunzler, Canandaigua, NY (US); David E. Seelye, North Chili, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/005,552

(22) Filed: Oct. 29, 2001

(65) Prior Publication Data

US 2003/0125497 A1 Jul. 3, 2003

(51) Int. Cl.[7] .............................................. C08F 230/08
(52) U.S. Cl. ..................... 526/279; 351/160 H; 528/32; 528/42
(58) Field of Search ................. 528/32, 42; 351/160 H; 526/279

(56) References Cited

U.S. PATENT DOCUMENTS

| | | | |
|---|---|---|---|
| 3,408,429 A | 10/1968 | Wichterle | 264/1 |
| 3,660,545 A | 5/1972 | Wichterle | 264/1 |
| 4,113,224 A | 9/1978 | Clark et al. | 249/105 |
| 4,153,641 A | 5/1979 | Deichert et al. | 260/827 |
| 4,189,546 A | 2/1980 | Deichert et al. | 528/26 |
| 4,197,266 A | 4/1980 | Clark et al. | 264/1 |
| 4,259,467 A | 3/1981 | Keogh et al. | 526/279 |
| 4,269,725 A | 5/1981 | Smith et al. | 252/174.25 |
| 4,440,918 A | 4/1984 | Rice et al. | 526/246 |
| 4,810,764 A | 3/1989 | Friends et al. | 526/245 |
| 4,954,587 A | 9/1990 | Mueller | 526/245 |
| 4,990,582 A | 2/1991 | Salamone | 526/245 |
| 5,010,141 A | 4/1991 | Mueller | 525/276 |
| 5,070,215 A | 12/1991 | Bambury et al. | 556/418 |
| 5,079,319 A | 1/1992 | Mueller | 526/238.23 |
| 5,142,009 A | 8/1992 | Kawaguchi | 526/245 |
| 5,260,000 A | * 11/1993 | Nandu et al. | 264/2.1 |
| 5,271,875 A | 12/1993 | Appleton et al. | 264/2.3 |
| 5,321,108 A | 6/1994 | Kunzler et al. | 526/242 |
| 5,358,995 A | 10/1994 | Lai et al. | 524/547 |
| 5,387,662 A | 2/1995 | Kunzler et al. | 526/245 |
| 5,449,729 A | 9/1995 | Lai | 526/286 |
| 5,512,205 A | 4/1996 | Lai | 252/182.14 |
| 5,539,016 A | * 7/1996 | Kunzler et al. | 523/107 |
| 5,610,252 A | 3/1997 | Bambury et al. | 526/279 |
| 6,020,445 A | 2/2000 | Vanderlaan et al. | 526/279 |
| 6,166,236 A | 12/2000 | Bambury et al. | 556/420 |

FOREIGN PATENT DOCUMENTS

| | | |
|---|---|---|
| EP | 0757033 | 2/1997 |
| WO | WO 94/18253 | 8/1994 |
| WO | WO 00/34347 | 6/2000 |

* cited by examiner

*Primary Examiner*—Margaret G. Moore
(74) *Attorney, Agent, or Firm*—John E. Thomas

(57) ABSTRACT

Vinyl carbonate endcapped polysiloxanes containing a fluorinated side chain are useful as biomaterials, especially hydrogel biomaterials, including contact lens materials.

16 Claims, No Drawings

US 6,891,010 B2

SILICONE HYDROGELS BASED ON VINYL CARBONATE ENDCAPPED FLUORINATED SIDE CHAIN POLYSILOXANES

FIELD OF THE INVENTION

The present invention relates to novel polymeric compositions and to medical devices made from such materials. The invention further particularly relates to polymers containing vinyl carbonate endcapped polysiloxanes having at least one polar fluorinated side chain. The monomers described herein can be used to make "hard" or "soft" contact lenses, intraocular implants, as well as other prostheses, and more particularly "soft" hydrogel contact lenses.

BACKGROUND

In the field of contact lenses, various factors must combine to yield a material that has appropriate characteristics. Oxygen permeability, wettability, material strength and stability are but a few of the factors that must be carefully balanced to achieve a useable contact lens. Since the cornea receives its oxygen supply exclusively from contact with the atmosphere, good oxygen permeability is a critical characteristic for any contact lens material. Wettability also is important in that, if the lens is not sufficiently wettable, it does not remain lubricated and therefore cannot be worn comfortably in the eye. The optimum contact lens would therefore, have both excellent oxygen permeability, and excellent tear fluid wettability.

Polysiloxane materials are useful materials for making contact lenses due to, among other properties, their excellent oxygen permeability. See U.S. Pat. Nos. 4,153,641 and 4,189,546. However polysiloxanes are generally hydrophobic. Certain hydrophilic functional groups may be attached to polysiloxane-containing monomers, or prepolymers to improve their wettability. See U.S. Pat. Nos. 4,260,725 and 4,259,467. However, many hydrophilic comonomers are known to be incompatible with the polysiloxane monomers in the monomer mix, and require the presence of solubilizers and compatibilizers for the monomer mixture properly polymerize. U.S. Pat. Nos. 5,321,108, 5,387,662 and 5,539,016 to Kunzler et al. teach fluorosiloxane-containing monomers having improved solubility in solvents such as N-vinyl pyrrolidone and N,N-dimethyl acrylamide.

In addition to oxygen permeability, wettability and compatibility requirements, contact lens materials must resist deposits. Some polysiloxane materials tend to accumulate deposits. Fluorinating certain polysiloxanes monomers is known to improve deposit resistance. See, for example, U.S. Pat. Nos. 4,440,918, 4,990,582, 4,954,587, 5,079,319 and 5,010,141.

Fluorinated polysiloxanes with useful properties for non-hydrogel contact lenses are disclosed in U.S. Pat. Nos. 4,810,764 and 5,142,009. It would be desirable to provide a hydrogel material containing fluorinated polysiloxanes that is useful as an ophthalmic lens material.

SUMMARY OF THE INVENTION

The present invention provides biocompatible materials based on vinyl carbonate endcapped polysiloxanes containing perfluorinated side chains. The vinyl carbonate endcapped siloxanes are preferably copolymerized with a hydrophilic comonomer such as N-vinyl pyrrolidinone, resulting in transparent, low modulus hydrogels possessing good properties for lens applications, including high oxygen permeability and good on-eye movement.

DETAILED DESCRIPTION OF THE INVENTION

This invention provides vinyl carbonate endcapped fluoro siloxane monomers and polymeric hydrogel materials useful as biocompatible materials. The term "biomaterial" as used herein means a material that can be used in long-term contact with bodily tissues. Uses for biomaterials, in addition to contact lenses and intraocular lenses, include implants, stents, catheters, and the like.

As used herein, the term "side chain" refers to any chain branching from the silicone atom of a siloxane group, and may be a side chain on the silicone atom in a polymeric structure composed of a polysiloxane backbone, especially a polydimethylsiloxane backbone.

The "terminal" carbon atom of a side chain refers to the carbon atom located at a position furthest from the siloxane group to which the fluorinated side chain is attached. The siloxanes of the invention are endcapped with vinyl carbonate groups. The term "endcapped" means that the vinyl carbonate groups are attached to the carbon atom located furthest from the siloxane group to which the fluorinated group is attached. Typically, the polysiloxane polymers are endcapped with vinyl carbonate radicals at terminal ends of the polysiloxane backbone of the polymeric structure.

It is preferred in the present invention to place the polar fluorinated group, —(CF$_2$)$_z$H, at the end of a side chain attached to a siloxane-containing monomer to enhance the solubility of the siloxane monomer in hydrophilic monomers, such as NVP. When the hydrogen atom in the terminal fluorinated carbon atom is replaced with a fluoro group, the siloxane-containing monomer is significantly less soluble, or not soluble at all in the hydrophilic comonomer.

In one embodiment of the present invention, fluorinated siloxane-containing monomers are disclosed having at least one fluorinated side chain, said side chain having the general Formula (I):

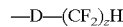

wherein z is 1 to 20; and
D is an alkylene group having 1 to 10 carbon atoms and which may have ether (—O—), carbonate (—OCOO—), carbamate (—NHCOO—), ester (—COO—) or amide (—CONH—) linkages between carbon atoms.

In a further embodiment, the fluorinated siloxane-containing monomers are based on polydimethylsiloxanes having at least one fluorinated side chain, and contain a moiety of the following general Formula (II):

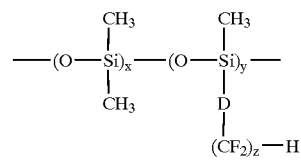

wherein D and z are as previously defined;
x is ≧0; and
y is ≧1.
More preferred are the fluorinated siloxane-containing monomers having the following general Formula (III):

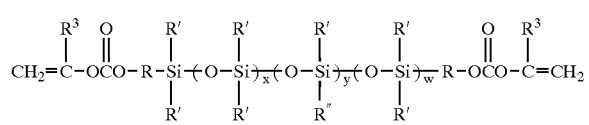

wherein:

each R is independently an alkylene group having 1 to 10 carbon atoms which may have ether linkages between carbon atoms;

each R' is independently a monovalent hydrocarbon radical or a halogen substituted monovalent hydrocarbon radical having 1 to 18 carbon atoms which may have ether linkages between carbon atoms;

each $R^3$ is hydrogen or methyl w and x are each $\geq 0$;

y is $\geq 1$;

w+x+y=2 to 1000, more preferably 25 to 200; and

R" is the fluorinated side chain, preferably a side chain of Formula (I)

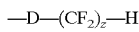

wherein D and z are as previously defined.

One especially preferred fluorinated side chain is represented by the formula:

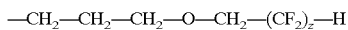

where z is 1 to 20, preferably 4.

The fluorinated polysiloxane-containing monomers of the present invention combine the desirable features of known hydrophilic side chain polysiloxanes, such as relative compatibility with hydrophilic monomers, with improved deposit resistance from the fluorinated group. Desired properties of the lenses may be affected and controlled. For example, by altering the relative ratio of the comonomers (the aforementioned fluorinated polysiloxane monomer to the hydrophilic monomer or monomers), certain hydrogel characteristics in the polymerized fluorinated polysiloxane copolymer may be altered.

The relative softness or hardness of the contact lenses fabricated from the resulting polymers of this invention can be varied by decreasing or increasing the molecular weight of the polysiloxane monomer endcapped with the activated unsaturated group or by varying the percent of the comonomers present. Generally, as the ratio of polysiloxane units to end-cap units increases, the softness of the material increases.

The present invention contemplates the use of the fluorinated polysiloxane monomer for both "hard" and "soft" contact lenses, the disclosed formulations are thought to be especially useful as "soft" hydrogel contact lenses. A lens is considered to be "soft" if it can be folded back upon itself without breaking.

Especially preferred are hydrogel copolymers. A hydrogel is a hydrated cross-linked polymeric system that contains water in an equilibrium state. Silicone hydrogels (i.e., hydrogels containing a silicone-containing monomer) are usually prepared by polymerizing a mixture of lens-forming monomers including at least one silicone-containing monomer and at least one hydrophilic monomer. Either the silicone-containing monomer of the present invention may function as a crosslinking agent, a crosslinking agent being defined as a monomeric material having multiple polymerizable functionalities, or alternatively, a separate crosslinking monomer may be employed.

Preferred hydrophilic comonomers include N-vinyl pyrrolidinone (NVP), N-vinylacetamide, N-vinyl-N-methyl acetamide, N-vinyl-N-ethyl acetamide, N-vinylformamide, N-vinyl-N-ethyl formamide, N-vinylformamide, 2-hydroxyethyl-vinyl carbonate, and 2-hydroxyethyl-vinyl carbamate (beta-alanine), with NVP being the most preferred.

For silicone hydrogels, the lens-forming monomer mixture may further include, in addition to the monomer of this invention and the hydrophilic monomer, an additional silicone-containing monomer. One preferred class of lens-forming silicone-containing monomers are known bulky, monofunctional polysiloxanylalkyl monomers represented by Formula (IV):

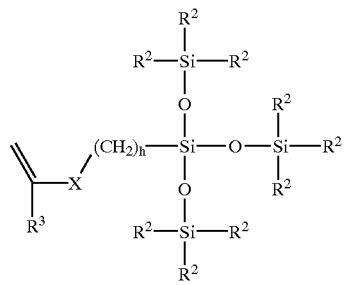

where X denotes —OCOO—, or —OCONR$^4$— where each R$^4$ is H or lower alkyl; R$^3$ denotes hydrogen or methyl; h is 1 to 10; and each R$^2$ independently denotes a lower alkyl or halogenated alkyl radical, a phenyl radical or a radical of the formula —Si(R$^5$)$_3$ wherein each R$^5$ is independently a lower alkyl radical or a phenyl radical. Such bulky monomers specifically include 3-[tris(trimethylsiloxy)silyl] propyl vinyl carbamate, and 3-[tris(trimethylsiloxy)silyl] propyl vinyl carbonate. These monomers are further described in U.S. Pat. No. 5,070,215 (Bambury et al.).

Another class of lens-forming silicone-containing monomers are those represented by Formula (V):

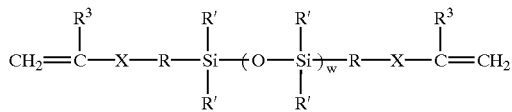

where:

X denotes —OCOO—, or —OCONR$^4$— where each R$^4$ is H or lower alkyl;

each R denotes an alkylene or haloalkylene group having 1 to 10 carbon atoms and which may have ether linkages between carbon atoms;

each R' is independently a monovalent hydrocarbon radical or a halogen substituted monovalent hydrocarbon radical having 1 to 18 carbon atoms which may have ether linkages between carbon atoms;

each R$^3$ is hydrogen or methyl; and w is $\geq 0$.

Specific examples include: 1,3-bis (4-vinyloxycarbonyloxy) but-1-yl)tetramethyl-disiloxane; wherein in Formula IV, w is about 25, each X—OCOO—, each R$^3$ is methyl, each R is butylene; and each R' is methyl. These monomeric materials are further described in U.S. Pat. No. 5,070,215.

The relative ratio (wt. %) of siloxane-containing monomer to total wt. % of comonomer mixture is preferably from about 10% to about 85%, more preferably from about 20% to about 70%, and most preferably from about 25% to about 40%. The relative ratio (wt. %) of hydrophilic monomer(s) to total wt. % of the comonomer mixture is preferably from about 20% to about 90%, more preferably from about 30% to about 80%, and most preferably from about 50% to about 60%.

Accordingly, for lens applications, the monomer mixtures employed in the invention include a monomeric material of this invention mixed with various conventional lens-forming monomers. All the lens-forming monomers are monomers that are polymerizable by free radical polymerization, generally including an activated unsaturated radical, and most preferably an ethylenically unsaturated radical. As used herein, the term "monomer" and like terms denote relatively low molecular weight compounds that are polymerizable by free radical polymerization, as well as higher molecular weight compounds also referred to as "prepolymers", "macromonomers", and similar terms. Optionally, the initial monomeric mixture may also include additional materials such as solvents, colorants, toughening agents, UV-absorbing agents and other materials such as those known in the contact lens art. Representative solvents are disclosed in U.S. Pat. No. 5,260,000 (Nandu et al.) and U.S. Pat. No. 6,020,445 (Vanderlaan et al.).

The instant copolymers can be readily cured to cast shapes by conventional free radical polymerization methods where the monomeric mixture is exposed to light radiation, such as visible light or UV radiation, to heat, or both, to induce polymerization. Representative free radical thermal polymerization initiators are organic peroxides, such as acetal peroxide, lauroyl peroxide, decanoyl peroxide, stearoyl peroxide, benzoyl peroxide tertiarybutyl peroxypivalate, peroxydicarbonate, and the like, employed in a concentration of about 0.01 to 1 percent by weight of the total monomer mixture. Representative UV initiators are those known in the field such as, benzoin methyl ether, benzoin ethyl ether, and those initiators available under the tradenames Darocure 1173, 1164, 2273, 1116, 2959, 3331 (EM Industries) and Igracure 651 and 184 (Ciba-Geigy).

According to various preferred embodiments, these hydrogel materials are suitable for biomedical applications. The terms "shaped articles for use in biomedical applications" or "biomedical devices or materials" mean the hydrogel materials disclosed herein have physicochemical properties rendering them suitable for prolonged contact with living tissue, blood and the mucous membranes.

Generally, the monomer mixtures may be charged to a mold, and then subjected to the light radiation or heat to effect curing of the monomer mixture in the mold. Various processes are known for curing a monomeric mixture in the production of contact lenses, including spincasting and static casting. Spincasting methods involve charging the monomer mixture to a mold, and spinning the mold in a controlled manner while exposing the monomer mixture to light. Static casting methods involve charging the monomer mixture between two mold sections, one mold section shaped to form the anterior lens surface and the other mold section shaped to form the posterior lens surface, and curing the monomer mixture by exposure to light. Such methods are described in U.S. Pat. Nos. 3,408,429, 3,660,545, 4,113,224, 4,197,266, and 5,271,875. Additionally, the monomer mixtures may be cast in the shape of rods or buttons, which are then lathe cut into a desired lens shape.

The hydrogels produced by the present invention are oxygen transporting, hydrolytically stable, biologically inert, and transparent. The monomers and copolymers employed in accordance with this invention are readily polymerized to form three-dimensional networks which permit the transport of oxygen and are optically clear, strong and hydrophilic.

The present invention further provides articles of manufacture which can be used for biomedical devices, such as, surgical devices, heart valves, vessel substitutes, intrauterine devices, membranes and other films, diaphragms, surgical implants, blood vessels, artificial ureters, artificial breast tissue and membranes intended to come into contact with body fluid outside of the body, e.g., membranes for kidney dialysis and heart/lung machines and the like, catheters, mouth guards, denture liners, intraocular devices, and especially contact lenses.

The following examples serve only to further illustrate aspects of the present invention and should not be construed as limiting the invention.

EXAMPLE 1–5

The vinyl carbonate endcapped polysiloxanes containing perfluorinated side chains of the present invention may be prepared according to the following general reaction scheme.

First, a cyclic siloxane tetramer, containing the perfluorinated side chain, is prepared according to Scheme I:

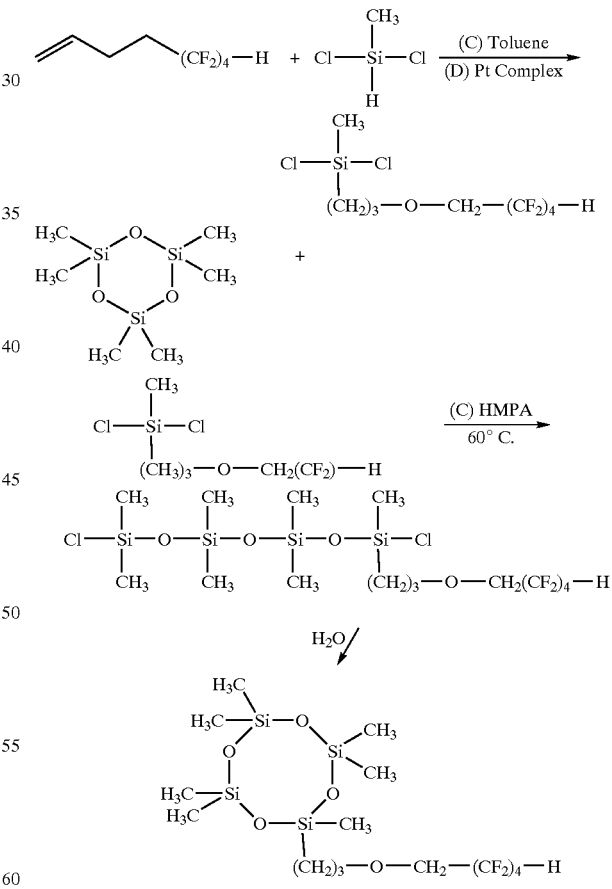

Next, the vinyl carbonate endcapped siloxanes are prepared by an acid catalyzed ring opening polymerization of this fluorinated cyclic siloxane tetramer (and optionally octamethylcyclotetrasiloxane) using a divinyl carbonate endcapped disiloxane, as shown in Scheme II:

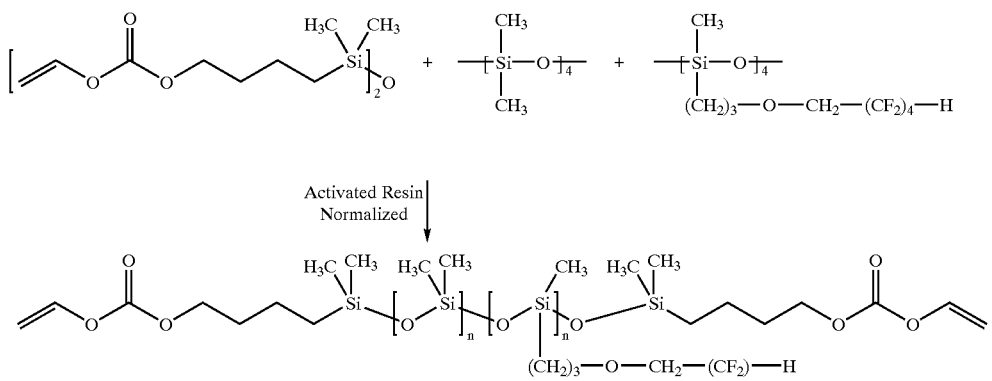

The activated resin employed in Scheme II is preferably prepared by placing amberlyst-15 resin (100 g) in a 1000-ml Erlenmeyer flask with 500 ml of THF. This mixture is stirred for 18 hours, then the resin is filtered off and allowed to air dry. Next, the recovered resin is placed in a 1000-ml Erlenmeyer flask with 400 ml of 0.1N HCl. This mixture is stirred for 3 hours and the acid is decanted. The resin is washed with distilled water until a neutral pH is obtained, and this resin is then dried.

To prepare the prepolymer in Scheme II, the dried resin is mixed with distilled water, and to this mixture is added the fluorinated cyclic siloxane tetramer, the divinyl carbonate endcapped disiloxane, and optionally, the octamethylcyclotetrasiloxane shown in Scheme II. When the octamethylcyclotetrasiloxane is employed in the reaction mixture, the molar ratio of the fluorinated cyclic siloxane tetramer and octamethylcyclotetrasiloxane is selected to obtain prepolymers having the desired x and y values in the following Formula (II) moiety of the prepolymers:

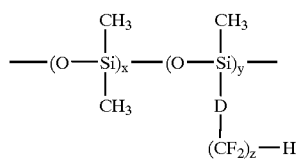

The amount of the divinyl carbonate endcapped disiloxane of Scheme II is selected based on the desired total siloxane chain length, i.e., (x+y) in Formula II above. Prepolymers with other flourinated side chains can be prepared similarly by employing cyclic siloxane tetramers with the desired side chain.

Following this procedure of Scheme II, the prepolymer of Example 1 was prepared by first mixing 10.0 g of the dried resin with 1.0 g of distilled water in a 3-neck round bottom flask. To this mixture was added the fluorinated cyclic siloxane tetramer (97.05 g), and the divinyl carbonate endcapped disiloxane (2.95 g). This reaction mixture was stirred for several days at room temperature, then filtered to remove the amberlyst resin. The final reaction product was a clear viscous fluid. The prepolymers of Examples 2 to 5, shown in Table 1, were prepared similarly. Each of the prepolymers in Table 1 are prepolymers of Formula (III), where each R is butylene, each R' is methyl, and R" is the side chain —$(CH_2)_3$—$OCH_2$—$CF_2)_4H$.

TABLE 1

| Example | x | y |
|---|---|---|
| 1 | 75 | 25 |
| 2 | 112.5 | 37.5 |
| 3 | 135 | 15 |
| 4 | 142.5 | 7.5 |
| 5 | 90 | 10 |

EXAMPLES 6–57

A series of monomer mixtures, suitable for providing silicone hydrogel contact lenses copolymeric materials, were prepared by mixing the components in Tables 2–6. The solvent employed in these mixtures was 3,7-dimethyl-3-octanol. In these following tables, NVP denotes the hydrophilic monomer N-vinyl pyrrolidinone, and TrisVC denotes the monofunctional polysiloxanylalkyl comonomer 3-[tris (trimethylsiloxy)silyl] propyl vinyl carbamate. Additionally, these monomer mixtures included 0.5 parts by weight (pbw) of the initiator Darocure-1173. The amounts listed in Tables 2–6 are parts by weight.

These monomer mixtures were cured between two silane-treated glass plates under an ultraviolet (UV) light source with an intensity of 300 microwatts for about 2 hours. The cured films were then released, extracted in isopropanol and dried overnight. The dried films were soaked and hydrated in a borate buffered saline solution overnight before characterization. Tensile tests were performed in borate buffered saline according to ASTM D-1708. The results are set forth in Table 1 where modulus is reported in units of $g/mm^2$, tear strength is reported in units of g/mm, and Dk is reported in units of Barrer.

TABLE 2

| Ex | Prepolymer of Ex 1 | Solvent | TrisVC | NVP | Modulus | Tear | Dk | % Water |
|---|---|---|---|---|---|---|---|---|
| 6 | 30 | 11.3 | 65 | 33 | 64 | 29 | 109.6 | 23.8 |
| 7 | 30 | 17.3 | 65 | 27 | 92 | 33 | 120.9 | 21.5 |
| 8 | 30 | 17.3 | 65 | 27 | 83 | 39 | 130.7 | 22.9 |
| 9 | 30 | 20.6 | 55.6 | 33 | 59 | 26 | 83.0 | 30.0 |
| 10 | 30 | 30 | 49.3 | 30 | 47 | 21 | 85.9 | 35.2 |
| 11 | 30.6 | 30 | 45.6 | 33 | 46 | 19 | 80.8 | 35.3 |
| 12 | 37.3 | 30 | 45 | 27 | 46 | 19 | 99.3 | 32.2 |
| 13 | 40.6 | 20.6 | 45 | 33 | 49 | 13 | 79.9 | 31.1 |
| 14 | 40.8 | 15.8 | 55.8 | 27 | 65 | 24 | 128.0 | 23.0 |
| 15 | 44.3 | 0 | 65 | 30 | 70 | 23 | 125.6 | 22.8 |
| 16 | 50 | 0 | 56.3 | 33 | 65 | 14 | 93.5 | 28.0 |
| 17 | 50 | 0 | 56.3 | 33 | 58 | 15 | 112.4 | 26.2 |
| 18 | 50 | 0 | 62.3 | 27 | 65 | 18 | 94.0 | 20.0 |
| 19 | 50 | 8.6 | 53.6 | 27 | 60 | 17 | 123.5 | 19.2 |
| 20 | 50 | 11.3 | 45 | 33 | 60 | 12 | 108.0 | 27.0 |
| 21 | 21.5 | 12.4 | 46.5 | 19.31 | 97 | 40 | 124.7 | 26.9 |
| 22 | 18.6 | 0 | 63 | 18 | 213 | 73 | 147.6 | 25.0 |
| 23 | 35.8 | 12.4 | 32.2 | 19.31 | 61 | 11 | 133.6 | 24.7 |
| 24 | 18.6 | 0 | 63 | 18 | 228 | 71 | 160.6 | — |

TABLE 3

| Ex | Prepolymer of Ex 2 | Solvent | TrisVC | NVP | Modulus | Tear | Dk | % Water |
|---|---|---|---|---|---|---|---|---|
| 25 | 30 | 14.3 | 65 | 30 | 57 | 40 | 83.3 | 29.0 |
| 26 | 30 | 20.6 | 55.6 | 33 | 113 | 29 | 77.3 | 36.3 |
| 27 | 40.6 | 20.6 | 45 | 33 | 45 | 19 | 82.7 | 33.7 |
| 28 | 40.8 | 15.8 | 55.8 | 27 | 66 | 34 | 116.1 | 27.2 |
| 29 | 50 | 11.3 | 45 | 33 | 56 | 16 | 95.8 | 30.8 |
| 30 | 40 | 20 | 55 | 30 | 58 | 21 | — | 26.9 |

TABLE 4

| Ex | Prepolymer of Ex 3 | Solvent | TrisVC | NVP | Modulus | Tear |
|---|---|---|---|---|---|---|
| 31 | 30 | 14.3 | 65 | 30 | — | — |
| 32 | 30 | 20.6 | 55.6 | 33 | — | — |
| 33 | 40.6 | 20.6 | 45 | 33 | — | — |
| 34 | 40.8 | 15.8 | 55.8 | 27 | 44 | 19 |
| 35 | 50 | 11.3 | 45 | 33 | 49 | 12 |
| 36 | 40 | 20 | 55 | 30 | 43 | 19 |

TABLE 5

| Ex | Prepolymer of Ex 4 | Solvent | TrisVC | NVP | Modulus | Tear |
|---|---|---|---|---|---|---|
| 37 | 30 | 14.3 | 65 | 30 | 49 | 28 |
| 38 | 30 | 20.6 | 55.6 | 33 | 41 | 17 |
| 39 | 40.6 | 20.6 | 45 | 33 | 34 | 13 |
| 40 | 40.8 | 15.8 | 55.8 | 27 | — | — |
| 41 | 50 | 11.3 | 45 | 33 | — | — |
| 42 | 40 | 20 | 55 | 30 | — | — |

TABLE 6

| Ex | Prepolymer of Ex 5 | Solvent | TrisVC | NVP | Modulus | Tear | Dk | % Water |
|---|---|---|---|---|---|---|---|---|
| 43 | 30 | 14.3 | 65 | 30 | 51 | 23 | 184.5 | 23.6 |
| 44 | 30 | 20.6 | 55.6 | 33 | 48 | 18 | 111.7 | 28.3 |
| 45 | 30 | 30 | 52.3 | 27 | 41 | 19 | 109.2 | 26.8 |
| 46 | 30 | 30 | 52.3 | 27 | 40 | 17 | 126.5 | 30.5 |
| 47 | 34.3 | 30 | 45 | 30 | 44 | 13 | 104.7 | 30.6 |
| 48 | 38.6 | 8.6 | 65 | 27 | 59 | 17 | 148.4 | 19.5 |
| 49 | 40.6 | 20.6 | 45 | 33 | 62 | 10 | 100.8 | 25.8 |
| 50 | 40.8 | 15.8 | 55.8 | 27 | 60 | 15 | 154.5 | 23.2 |
| 51 | 41.3 | 0 | 65 | 33 | 57 | 15 | 146.5 | 24.3 |
| 52 | 41.3 | 0 | 65 | 33 | 55 | 14 | 100.3 | 23.4 |
| 53 | 48.6 | 0 | 63.6 | 27 | 63 | 13 | 141.1 | 19.5 |
| 54 | 50 | 7.2 | 52.2 | 30 | 70 | 10 | 149.2 | 21.9 |
| 55 | 50 | 11.3 | 45 | 33 | 69 | 9 | 151 | 26.2 |

TABLE 6-continued

| Ex | Prepolymer of Ex 5 | Solvent | TrisVC | NVP | Modulus | Tear | Dk | % Water |
|---|---|---|---|---|---|---|---|---|
| 56 | 50 | 17.3 | 45 | 27 | 68 | 7 | 116.6 | 34.8 |
| 57 | 50 | 17.3 | 45 | 27 | 74 | 10 | 172.8 | 20.8 |

EXAMPLE 58

Various monomer mixtures in Tables 2–6 may be used to cast contact lenses. The monomer mixture is placed on the molding surface of a first plastic mold section, shaped to provide an anterior contact lens surface, and a second plastic mold section having a molding surface shaped to provide a posterior contact lens surface, the monomer mixture being contained in the mold cavity formed between these two molding surfaces. This assembly is subjected to a UV light source to cure the monomer mixture. Following curing, the two mold sections are separated to recover the contact lens.

Many other modifications and variations of the present invention are possible to killed practitioner in the field in light of the teachings herein. It is therefore stood that, within the scope of the claims, the present invention can be practiced than as herein specifically described.

We claim:

1. A hydrogel that is the hydrated polymerization product of a monomer mixture comprising a hydrophilic monomer, and a monomer of the formula:

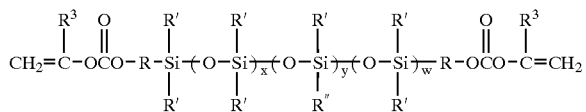

wherein:
each R is independently an alkylene group having 1 to 10 carbon atoms which may have ether linkages between carbon atoms;
each R' is independently a monovalent hydrocarbon radical or a halogen substituted monovalent hydrocarbon radical having 1 to 18 carbon atoms which may have ether linkages between carbon atoms;
each $R^3$ is hydrogen or methyl
w and x are each $\geq 0$;
y is $\geq 1$;
w+x+y=2 to 1000; and
R" is a fluorinated side chain of the formula —D—$(CF_2)_z$—H, wherein z is 1 to 20, and D is an alkylene group having 1 to 10 carbon atoms which may have ether, carbonate, carbamate, ester or amide linkages between carbon atoms,
wherein said hydrogel has an oxygen permeability of at least about 120 Barrers, a water content of at least about 20 weight percent, and a modulus no greater than about 97 g/mm².

2. The hydrogel of claim 1, wherein said monomer mixture further comprises a monofunctional polysiloxanylalkyl monomer.

3. The hydrogel of claim 2, wherein the monofunctional polysiloxanylalkyl monomer is represented by the formula:

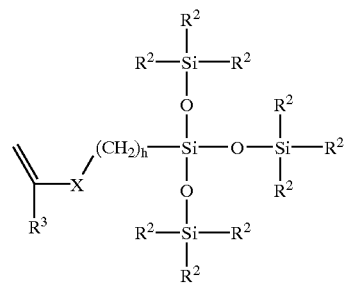

wherein:
X denotes —OCOO—, or —OCONR⁴— where each $R^4$ is H or lower alkyl;
$R^3$ denotes hydrogen or methyl;
h is 1 to 10; and
each $R^2$ independently denotes a lower alkyl or halogenated alkyl radical, a phenyl radical or a radical of the formula —Si$(R^5)_3$ wherein each $R^5$ is independently a lower alkyl radical or a phenyl radical.

4. The hydrogel of claim 3, wherein the monofunctional polysiloxanylalkyl monomer is selected from the group consisting of 3-[tris(trimethylsiloxy)silyl] propyl vinyl carbamate and 3-[tris(trimethylsiloxy)silyl] propyl vinyl carbonate.

5. The hydrogel of claim 1, wherein said hydrophilic monomer is selected from the group consisting of N-vinyl-N-methyl acetamide, N-vinyl-N-ethyl acetamide, N-vinyl-N-ethyl formamide, N-vinyl-formamide, N-vinyl-2-pyrrolidone, and mixtures thereof.

6. The hydrogel of claim 5, wherein the hydrophilic monomer includes N-vinyl-2-pyrrolidone.

7. The hydrogel of claim 1, wherein R" is —$CH_2$—$CH_2$—$CH_2$—O—$CH_2$—$(CF_2)_4$—H.

8. A contact lens made from the polymerization product of a monomer mixture which comprises a vinyl carbonate endcapped polysiloxane containing a fluorinated side chain, wherein said contact lens is composed of a hydrogel having an oxygen permeability of at least about 120 Barrers, a water content of at least about 20 weight percent, and a modulus no greater than about 97 g/mm².

9. The contact lens of claim 8, wherein the vinyl carbonate endcapped polysiloxane is of the formula:

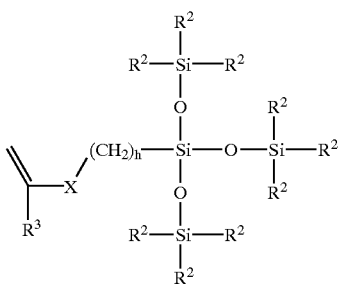

wherein:

each R is independently an alkylene group having 1 to 10 carbon atoms which may have ether linkages between carbon atoms;

each R' is independently a monovalent hydrocarbon radical or a halogen substituted monovalent hydrocarbon radical having 1 to 18 carbon atoms which may have ether linkages between carbon atoms;

each $R^3$ is hydrogen or methyl w and x are each $\geq 0$;

y is $\geq 1$;

w+x+y=2 to 1000; and

R" is a fluorinated side chain of the formula —D—$(CF_2)_z$—H, wherein z is 1 to 20, and D is an alkylene group having 1 to 10 carbon atoms which may have ether, carbonate, carbamate, ester or amide linkages between carbon atoms.

10. The contact lens of claim 9, wherein the monomer mixture further comprises a hydrophilic monomer.

11. The contact lens of claim 10, wherein said hydrophilic monomer is selected from the group consisting of N-vinyl-N-methyl acetamide, N-vinyl-N-ethyl acetamide, N-vinyl-N-ethyl formamide, N-vinyl-formamide, N-vinyl-2-pyrrolidone, and mixtures thereof.

12. The contact lens of claim 11, wherein the hydrophilic monomer includes N-vinyl-2-pyrrolidone.

13. The contact lens of claim 10, wherein said monomer mixture further comprises a monofunctional polysiloxanylalkyl monomer.

14. The contact lens of claim 13, wherein the monofunctional polysiloxanylalkyl monomer is represented by the formula:

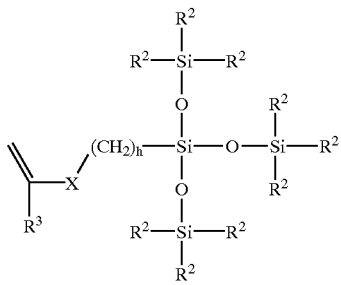

wherein:

X denotes —OCOO—, or —OCONR$^4$— where each $R^4$ is H or lower alkyl;

$R^3$ denotes hydrogen or methyl;

h is 1 to 10; and each $R^2$ independently denotes a lower alkyl or halogenated alkyl radical, a phenyl radical or a radical of the formula —Si$(R^5)_3$ wherein each $R^5$ is independently a lower alkyl radical or a phenyl radical.

15. The contact lens of claim 14, wherein the monofunctional polysiloxanylalkyl monomer is selected from the group consisting of 3-[tris(trimethylsiloxy)silyl] propyl vinyl carbamate and 3-[tris(trimethylsiloxy)silyl] propyl vinyl carbonate.

16. The contact lens of claim 9, wherein R" is —$CH_2$—$CH_2$—$CH_2$—O—$CH_2$—$(CF_2)_4$—H.

* * * * *

UNITED STATES PATENT AND TRADEMARK OFFICE
CERTIFICATE OF CORRECTION

PATENT NO.      : 6,891,010 B2  
APPLICATION NO. : 10/005552  
DATED           : May 10, 2005  
INVENTOR(S)     : Jay F. Kunzler et al.

Page 1 of 1

It is certified that error appears in the above-identified patent and that said Letters Patent is hereby corrected as shown below:

Col. 11, line 55 & 56,
  replace "--D-- $(CF_2)_2$--H"
  with -- -D--$(CF_2)_z$--H--

Col. 13, line 1 replace

" 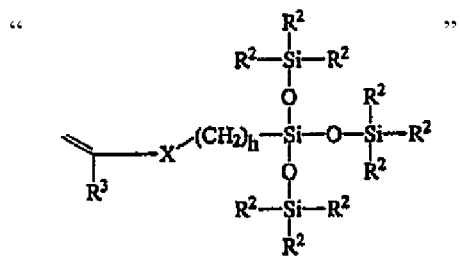 "

with

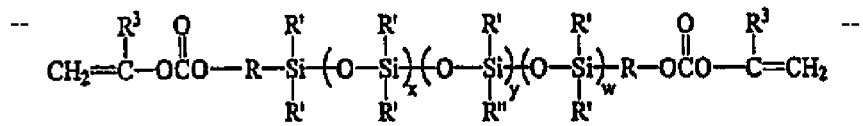

Signed and Sealed this

First Day of May, 2007

JON W. DUDAS  
*Director of the United States Patent and Trademark Office*